US009574621B2

United States Patent
Ijames, Jr.

(10) Patent No.: US 9,574,621 B2
(45) Date of Patent: Feb. 21, 2017

(54) ANTI-CONTAMINATION ASSEMBLY FOR CLUTCH ADJUSTMENT MECHANISM

(71) Applicant: Ace Manufacturing and Parts Co., Sullivan, MO (US)

(72) Inventor: Kevin M. Ijames, Jr., Sullivan, MO (US)

(73) Assignee: Ace Manufacturing and Parts Co., Sullivan, MO (US)

( * ) Notice: Subject to any disclaimer, the term of this patent is extended or adjusted under 35 U.S.C. 154(b) by 87 days.

(21) Appl. No.: 14/557,619

(22) Filed: Dec. 2, 2014

(65) Prior Publication Data
US 2016/0153503 A1   Jun. 2, 2016

(51) Int. Cl.
*F16D 13/40*    (2006.01)
*F16D 13/75*    (2006.01)

(52) U.S. Cl.
CPC ..... *F16D 13/757* (2013.01); *F16D 2250/0084* (2013.01); *F16D 2300/08* (2013.01)

(58) Field of Classification Search
CPC ........ F16D 13/40; F16D 13/757; F16D 13/75; F16D 2300/08
See application file for complete search history.

(56) References Cited

U.S. PATENT DOCUMENTS

| | | |
|---|---|---|
| 3,887,198 A | 6/1975 | McClure et al. |
| 4,277,072 A | 7/1981 | Forch |
| 4,989,709 A | 2/1991 | Takeuchi |
| 5,230,413 A | 7/1993 | Lewis et al. |
| 5,263,564 A | 11/1993 | Flotow |
| 5,411,122 A | 5/1995 | Uphaus |
| 6,098,773 A | 8/2000 | Blessinger et al. |
| 6,450,315 B1 | 9/2002 | Blessinger et al. |
| 6,655,517 B2 | 12/2003 | Cole et al. |
| 6,722,657 B2 | 4/2004 | Hood et al. |
| 6,874,608 B2 | 4/2005 | Conrad et al. |
| 7,198,144 B2 | 4/2007 | McCutcheon et al. |
| 7,523,944 B2 | 4/2009 | Hatori |
| 7,654,536 B2 | 2/2010 | Umetsu et al. |
| 2002/0074203 A1 | 6/2002 | Blessinger et al. |
| 2006/0055119 A1 | 3/2006 | Hatori |
| 2006/0113156 A1 | 6/2006 | McCutcheon et al. |

Primary Examiner — Jacob S Scott
Assistant Examiner — Tinh Dang
(74) Attorney, Agent, or Firm — Senniger Powers LLP

(57) ABSTRACT

A clutch assembly. The assembly includes a cover having a threaded inwardly facing surface and an adjusting ring having a threaded outwardly facing surface threadably received in the inwardly facing surface of the cover. The assembly also includes a pressure plate, a friction disc, a lever reacting against the adjusting ring to move the pressure plate into and out of engagement with the friction disc, and an adjustment mechanism. The assembly includes an elastically compressible seal assembly extending between opposing axially facing surfaces of the cover and the adjusting ring to prevent contamination from passing the seal assembly and accumulating on the threaded inwardly facing surface of the cover.

16 Claims, 6 Drawing Sheets

ANTI-CONTAMINATION ASSEMBLY FOR CLUTCH ADJUSTMENT MECHANISM

BACKGROUND

The present invention generally relates to clutch assemblies having an adjustment mechanism, and more particularly, to a seal for preventing contamination in a portion of the adjustment mechanism.

Clutch assemblies transmit torque from a driving member to a driven member. Clutch assemblies generally include a cover attached to the driving member and a pressure plate that moves relative to the cover to selectively engage friction members attached to the driven member to permit torque transmission. An adjusting ring threadably mounted on the cover provides a fulcrum against which a clutch release mechanism acts to move the pressure plate into and out of engagement with the friction members. In order to compensate for friction member wear, the adjusting ring is rotated in the cover to move the fulcrum position of the clutch release mechanism.

Over time, road dirt and debris, as well as fine particles formed as the pressure plate engages and disengages the friction members, accumulate in various places inside the clutch assembly. One place in particular where the particles accumulate is in a cavity defined in part by the clutch cover and adjusting ring. These particles can contaminate the threaded interface between the clutch cover and adjusting ring, preventing free movement of the adjusting ring relative to the clutch cover. The particles can also become packed between the clutch cover and lugs extending from a surface of the adjusting ring facing the clutch cover, preventing free movement of the adjusting ring. When the particles can prevent clutch adjustment to compensate for friction member wear, they limit a useful life of the clutch assembly or shorten intervals between clutch assembly removal and maintenance.

Past attempts to prevent particles from interfering with free movement of the adjusting ring relative to the clutch cover include positioning rubber seals over the threads at each end of the threaded interface between the clutch cover and adjusting ring. Depending upon the configurations of the seals, particles can still accumulate on exposed portions of the threads not covered by the seals. Over time, the particles can limit adjusting ring movement. Accordingly, there remains a need for preventing particle accumulation at the interface between the clutch cover and adjusting ring.

SUMMARY

In one aspect, the present disclosure includes a clutch assembly. The assembly comprises a cover adapted for connecting to a driving member extending along a central axis and having a threaded inwardly facing surface. The assembly also includes an adjusting ring having a threaded outwardly facing surface threadably received in the inwardly facing surface of the cover for selective rotation with respect to the cover about the central axis to change a relative axial position of the adjusting ring relative to the cover. Further, the assembly includes a pressure plate coaxially mounted on the cover for axial movement relative to the cover and a friction disc adapted for connection to a driven member coaxially mounted on the cover adjacent the pressure plate. The assembly has a lever reacting against the adjusting ring to move the pressure plate into and out of engagement with the friction disc and an adjustment mechanism secured to the cover and cooperating with the adjusting ring for rotating the adjusting ring with respect to the cover to change an axial position of the adjusting ring relative to the cover. In addition, the assembly comprises an elastically compressible seal assembly centered on the central axis and extending between opposing axially facing surfaces of the cover and the adjusting ring to prevent contamination from passing the seal assembly and accumulating on the threaded inwardly facing surface of the cover.

In another aspect, the present disclosure includes a method of assembling a clutch assembly. The method comprises positioning a seal assembly on an adjusting ring and threading the adjusting ring having the seal assembly in a cover. A pressure plate and a friction disc are assembled on the cover having the adjusting ring and seal assembly.

In yet another aspect, the present disclosure includes a clutch assembly comprising a cover adapted for connecting to a driving member extending along a central axis. The assembly includes an adjusting ring threadably mounted on the cover for selective rotation with respect to the cover about the central axis to change a relative axial position of the adjusting ring relative to the cover. The adjusting ring has a groove facing the cover. In addition, the assembly comprises a seal assembly including an annular ring sized and shaped for receipt in the groove of the adjusting ring to center the seal assembly on central axis and an elastically compressible ring attached to the annular ring. The compressible ring is sized and shaped for contacting the cover when the adjusting ring is mounted on the cover to prevent contamination from passing the seal assembly and accumulating on inwardly facing threads of the cover.

Other aspects of the present disclosure will be apparent in view of the following description and claims.

DETAILED DESCRIPTION OF THE DRAWINGS

Figure 1:
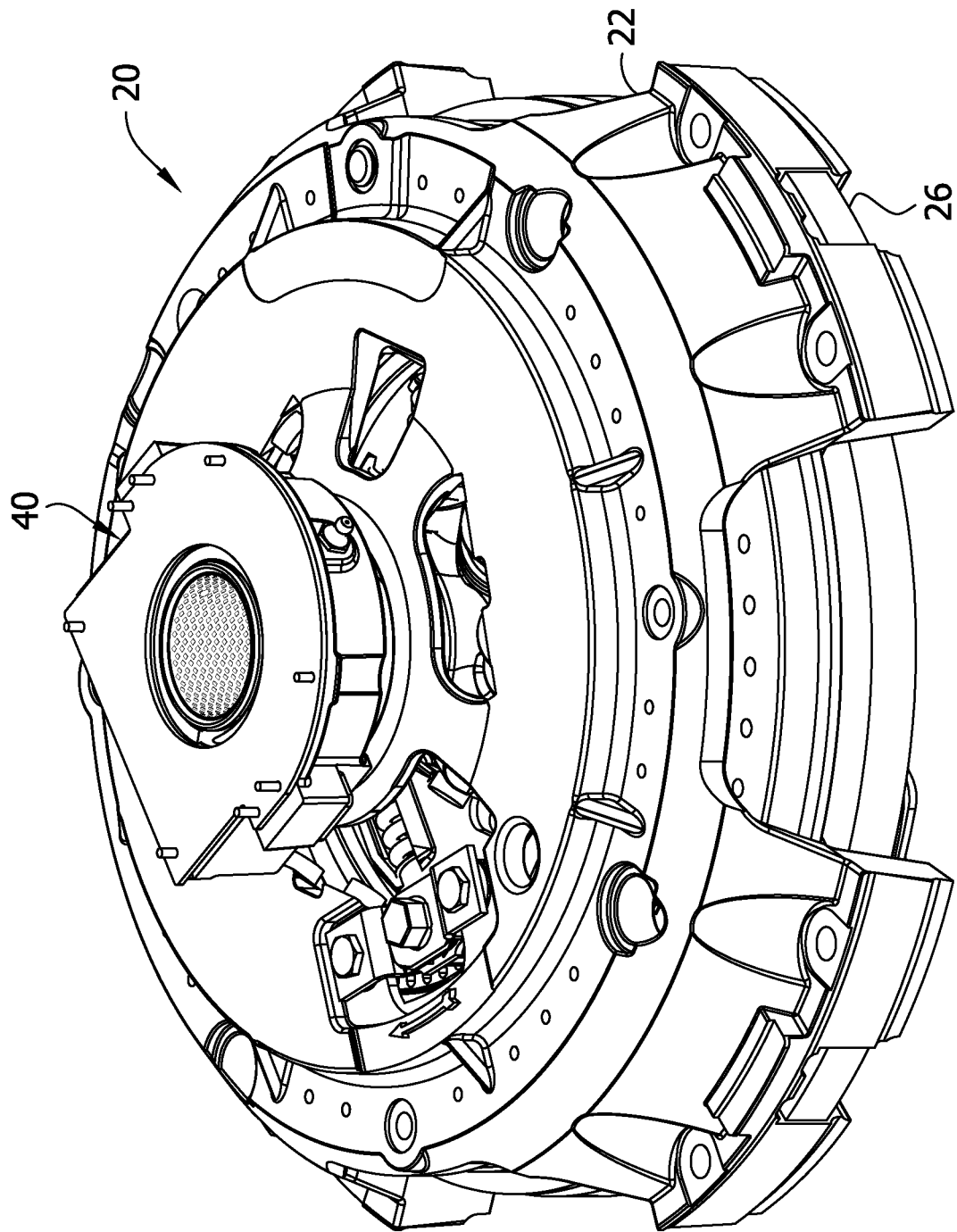
FIG. 1 is a of a clutch assembly.

Referring to FIG. 1, a clutch assembly is designated in its entirety by the reference number 20. As will be appreciated by those skilled in the art, the clutch assembly 20 selectively interconnects a driving member or shaft I (FIG. 2), such as an engine crankshaft of an automobile, with a driven member or shaft O (FIG. 2), such as a transmission gearbox input shaft. The driving shaft I and the driven shaft O are operatively connected through the clutch assembly 20 so torque can be transmitted between the shafts and when the driving shaft rotates. A vehicle operator actuates the clutch assembly 20 to disengage the clutch, interrupting torque transmission between the shafts allowing the operator to shift gears in a vehicle transmission.

Figure 2:
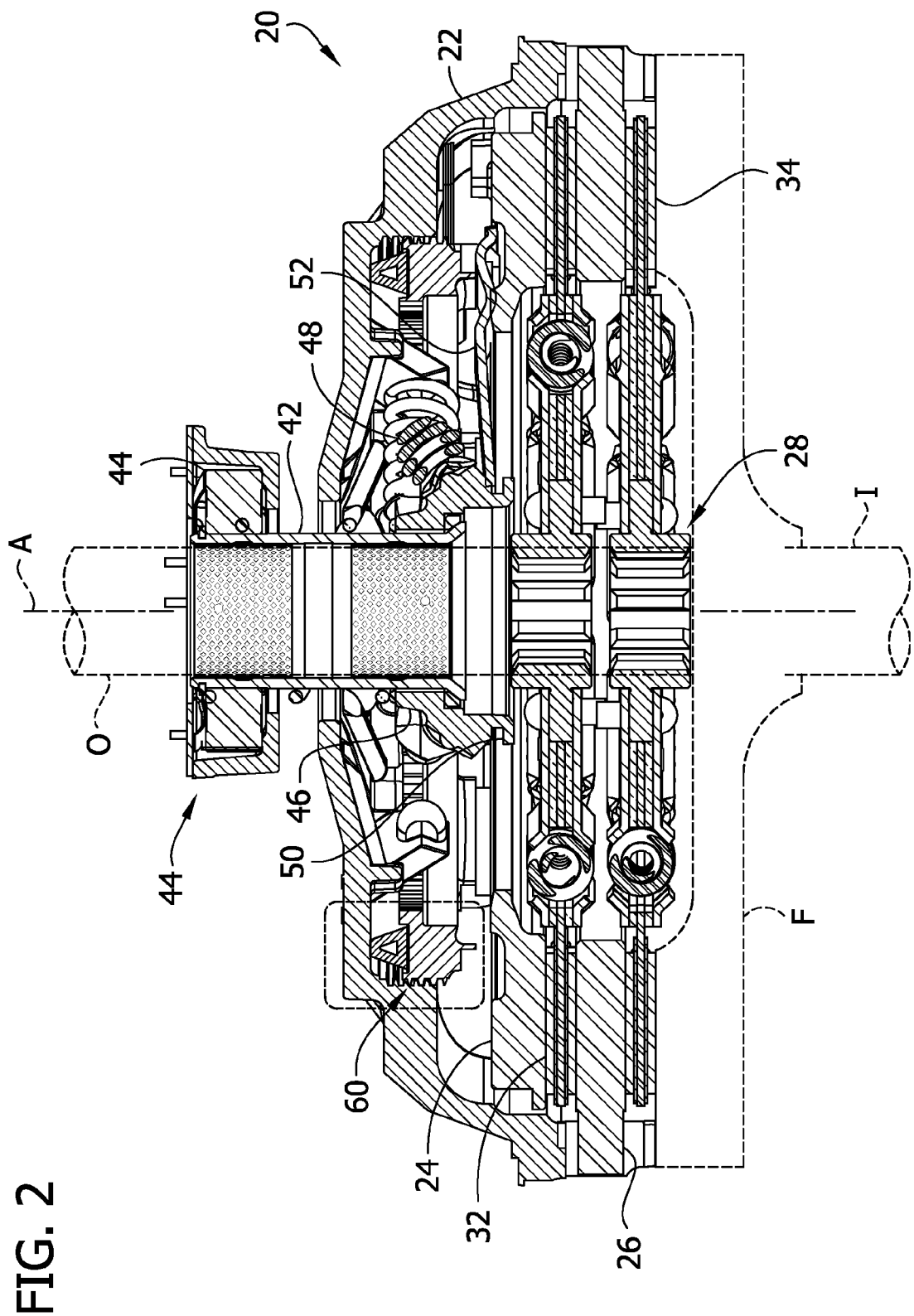
FIG. 2 is a cross section of the clutch assembly.

As shown in FIG. 2, the clutch assembly 20 includes a cover 22, a primary pressure plate 24, a secondary or intermediate pressure plate 26, and a friction disc assembly, generally designated by 28, coaxially aligned on a common central axis A. In operation, the cover 22 is fixedly connected to a flywheel F mounted on a driving shaft I so the cover 22 rotates in unison with the flywheel and driving shaft about their central axis A. Both the primary pressure plate 24 and the intermediate pressure plate 26 are fastened to the cover 22 so they also turn in unison with the cover. The primary pressure plate 24 is axially movable with respect to the cover 22 between an engaged position and a disengaged position. In the engaged position, the primary pressure plate 24 is forced against the friction disc assembly 28 so torque is transmittable between the primary pressure plate and disc assembly.

The friction disc assembly 28 comprises a first friction disc 32 against which the primary pressure plate 24 is forced and a second friction disc 34 that is axially spaced from the first friction disc. The secondary pressure plate 26 is sandwiched between the first friction disc 32 and the second friction disc 34. Each of the first and second friction discs 32, 34 has a splined central opening configured to couple to the driven shaft O so the friction disc assembly 28 turns in unison with the driven shaft. As will be understood by the skilled artisan, as the primary pressure plate 24 is forced against the first friction disc 32, the first friction disc 32 is forced against the secondary pressure plate 26 and the secondary pressure plate is forced against the second friction disc 34, which is forced against the flywheel F, transmitting torque through the multiple resulting interfaces. The multiple interfaces provide increased engagement area compared to the area provided by a single friction disc, permitting increased torque transmission through the multiple interfaces. In the disengaged position, the primary and secondary pressure plates 24, 26 release the friction discs 32, 34, allowing the friction disc assembly 28 to rotate independently from the pressure plates. When the primary and secondary pressure plates 24, 26 engage the friction disc assembly 28, the clutch assembly 20 transmits torque between the driving shaft I and the driven shaft O so the driven shaft turns with the driving shaft. When the primary and secondary pressure plates 24, 26 disengage the friction disc assembly 28, the driving shaft I is substantially free to rotate independently from the driven shaft O.

As further illustrated in FIG. 2, the clutch assembly 20 also includes a thrust bearing assembly, generally designated by 40, that slides axially on the driven shaft O as the operator actuates the clutch. The thrust bearing assembly 40 includes a sleeve 42 that fits over the driven shaft O so the sleeve is axially slidable along the shaft. The sleeve 42 rotates freely on the driven shaft. One end of the sleeve 42 flares to engage a retaining collar 46. The collar 46 and sleeve 42 rotate in unison with the cover 22 and are biased by a plurality of pressure springs 48 toward the friction disc assembly 28 as shown in FIG. 2. A groove 50 in the collar 46 receives radially inner tips of levers 52. These levers 52 engage the primary pressure plate 24, pushing the plate into engagement with the friction disc assembly 28 as previously described. The levers 52 also engage an adjusting ring, generally designated by 60, mounted on the cover 22. Therefore, the levers 52 are also biased by the pressure springs 48 toward the clutch-engaging position shown in FIG. 2. In this position, each lever 52 pivots in one direction relative to the adjusting ring 60 and cover 22 to apply a generally axial force on the primary pressure plate 24, urging the primary pressure plate to its engaged position, in which the driving shaft I and driven shaft O turn in unison. When the clutch is actuated (e.g., when the operator pushes the clutch pedal) the thrust bearing assembly 40 moves in an axial direction away from the flywheel F, the pressure springs 48 are compressed, and the levers 52 pivot to a clutch-disengaging position in which each lever pivots in an opposite direction to permit the primary pressure plate to move toward its disengaged position. In this position, the driving shaft I is able to turn separately from the driven shaft O. For additional details, reference may be made to U.S. Pat. No. 3,394,788, which is incorporated by reference for all purposes consistent with this disclosure.

Figure 3:
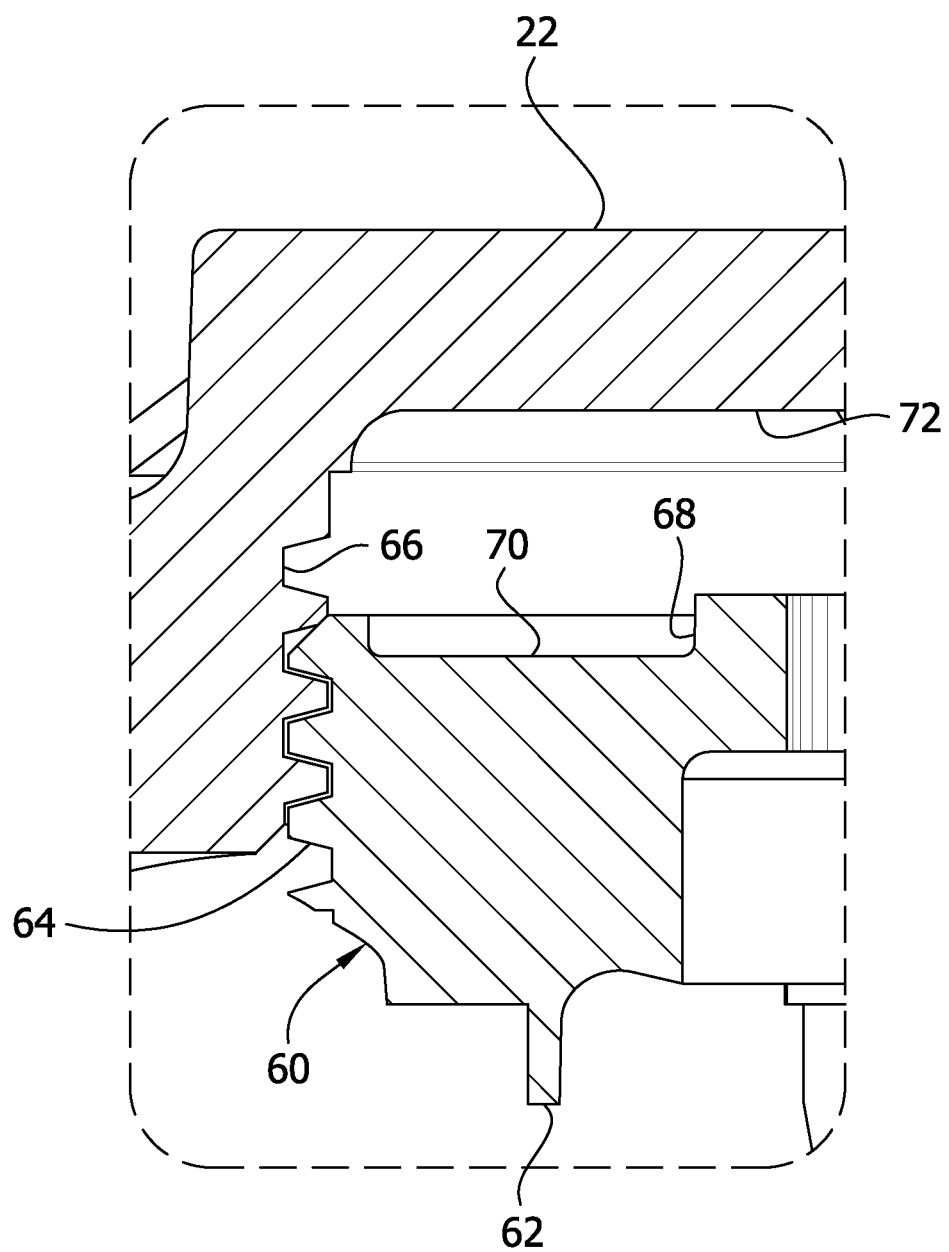
FIG. 3 is a detail of an adjusting ring positioned in a clutch cover.

As shown in FIG. 3, the adjusting ring 60 includes fulcrum bosses 62 against which the levers 52 react and pivot when pushing the primary pressure plate 24 as shown in FIG. 2. The adjusting ring 60 has a threaded outer diametrical surface 64 that engages a corresponding threaded inner diametrical surface 66 of the cover 22. This arrangement allows the axial position of the fulcrum bosses 62 to be adjusted relative to the cover 22 by rotating the adjusting ring 60 in the cover. An end of the adjusting ring 60 opposite the fulcrum bosses is machined into a groove 68 having a broad, smooth face 70 that faces a corresponding land 72 on the cover 22. FIG. 3 illustrates the assembly without a seal assembly of the prevent invention in position. Because the cover 22 and adjusting ring 60 spin about the central axis A (FIG. 2) of the clutch assembly 20 contamination is centrifugally thrown outward, forced against inwardly facing surfaces and away from outwardly facing surfaces. Accordingly, contamination does not tend to build up on the outwardly facing threads 64 of the adjusting ring 60. Contamination tends to build up on the inwardly facing threads 66 of the cover 22.

Figure 4:
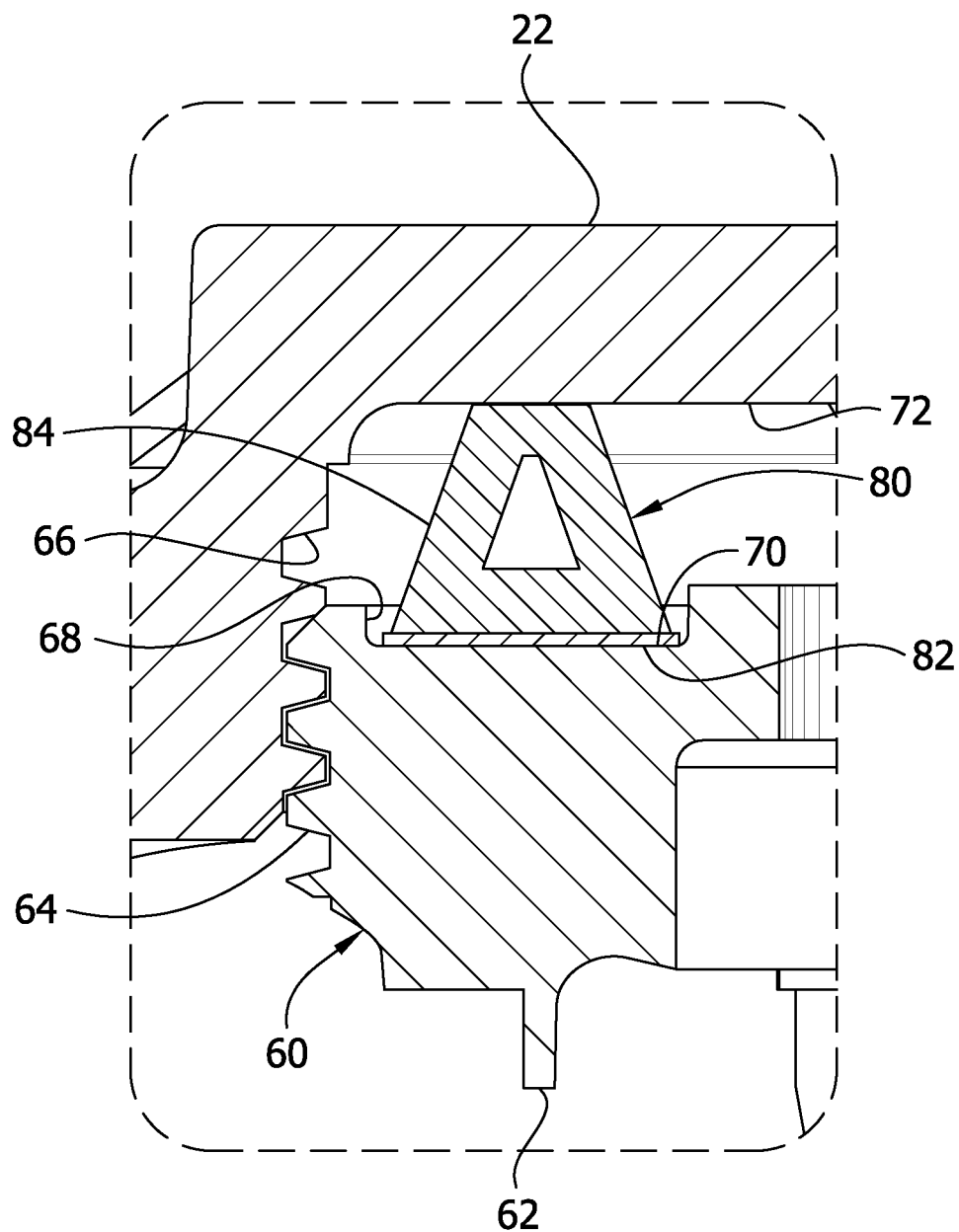
FIG. 4 is a detail of the adjusting ring positioned in the clutch cover with a seal.

FIG. 4 illustrates a seal assembly, generally designated by 80, of the present invention sandwiched between the smooth face 70 of the adjusting ring 60 and the corresponding land 72 on the cover 22. The seal assembly 80 is elastically compressible to ensure the assembly fills the gap between the face 70 and land 72 regardless of the location of the adjusting ring 60 relative to the cover 22. The seal assembly 80 comprises a thin annular plate 82 bonded to an elastically compressible ring 84. The annular plate 82 is sized for receipt in the groove 68 of the adjusting ring 60 so the plate is centered about the central axis A and slides circumferentially against the broad, smooth face 70 of the groove. Although the annular plate 82 may be made of other materials having sufficiently low coefficient of friction and temperature capability, in one embodiment the plate is stainless steel. This material is advantageous because it resists corrosion, which could increase sliding friction between the annular plate 82 and the adjusting ring 60. The coefficient of friction between the annular plate 82 and the adjusting ring 60 is sufficiently low compared to the coefficient of friction between the compressible ring 84 and the cover 22 to allow the annular plate to slide circumferentially in the adjusting ring groove 68 while the compressible ring remains stationary with respect to the cover. It is envisioned that the annular plate could be made from other metals provided they were treated to remain corrosion free and the metal withstood temperatures in an operating range between about −40° F. and 350° F. Likewise, a molded polymer having a suitable coefficient of friction and temperature capability could be substituted without departing from the scope of the present invention.

As further illustrated in FIG. 4, the compressible ring 84 in some embodiments tapers so that the surface contacting the cover 22 is smaller than the surface area of the annular plate 82 that contacts the adjusting ring 60. Thus, under the same load, the pressure on the smaller end of the compressible ring 84 is greater than the pressure on the annular plate 82. This configuration also increases the frictional forces at the smaller end of the compressible ring 84 relative to the larger end, further ensuring that the compressible ring remains stationary with the cover 22 as the adjusting ring 60 rotates in the groove 68. As shown in FIG. 4, the compressible ring 84 has a hollow triangular cross section in some embodiments. It is believed the triangular shape eases assembly and provides the previously mentioned surface area advantage with respect to friction. And, it is believed the hollow shape improves compressibility and elasticity.

Although the compressible ring 84 may be made of other materials without departing from the scope of the present invention, in one embodiment the compressible ring is closed cell foam that limits absorption of fluids and has sufficient temperature capabilities. In one embodiment the ring 84 is made from Bellofram Silicones 5104 soft density, extruded, closed cell silicone sponge product available from Bellofram Silicones, Inc. of Newell, W. Va. Alternatively, open cell foam having a skin or coating to prevent liquid absorption could be used without departing from the scope of the present invention. In another alternative, the compressible foam 84 and the annular plate 82 could be replaced with a metal E-ring, providing a unitary seal having compressibility and a low coefficient of friction.

Various adjustment mechanisms may be used to rotate the adjusting ring 60 relative to the cover 22, moving the adjusting ring axially relative to the cover in response to changes in clutch engagement resulting from wear. When the adjustment mechanism rotates the adjusting ring 60, the threads 64, 66 on the adjusting ring and cover 22 drive the ring axially, changing the axial location of the fulcrum bosses 62. For example, rotating the adjusting ring 60 in one direction moves the adjusting ring toward the flywheel F, also moving the fulcrum bosses 62 toward the flywheel. By moving the fulcrum bosses 62 toward the flywheel F, the thrust bearing assembly 40 need not move as far toward the flywheel to push the primary pressure plate 24 into engagement with the friction disc assembly 28 to engage the clutch.

Figure 5:
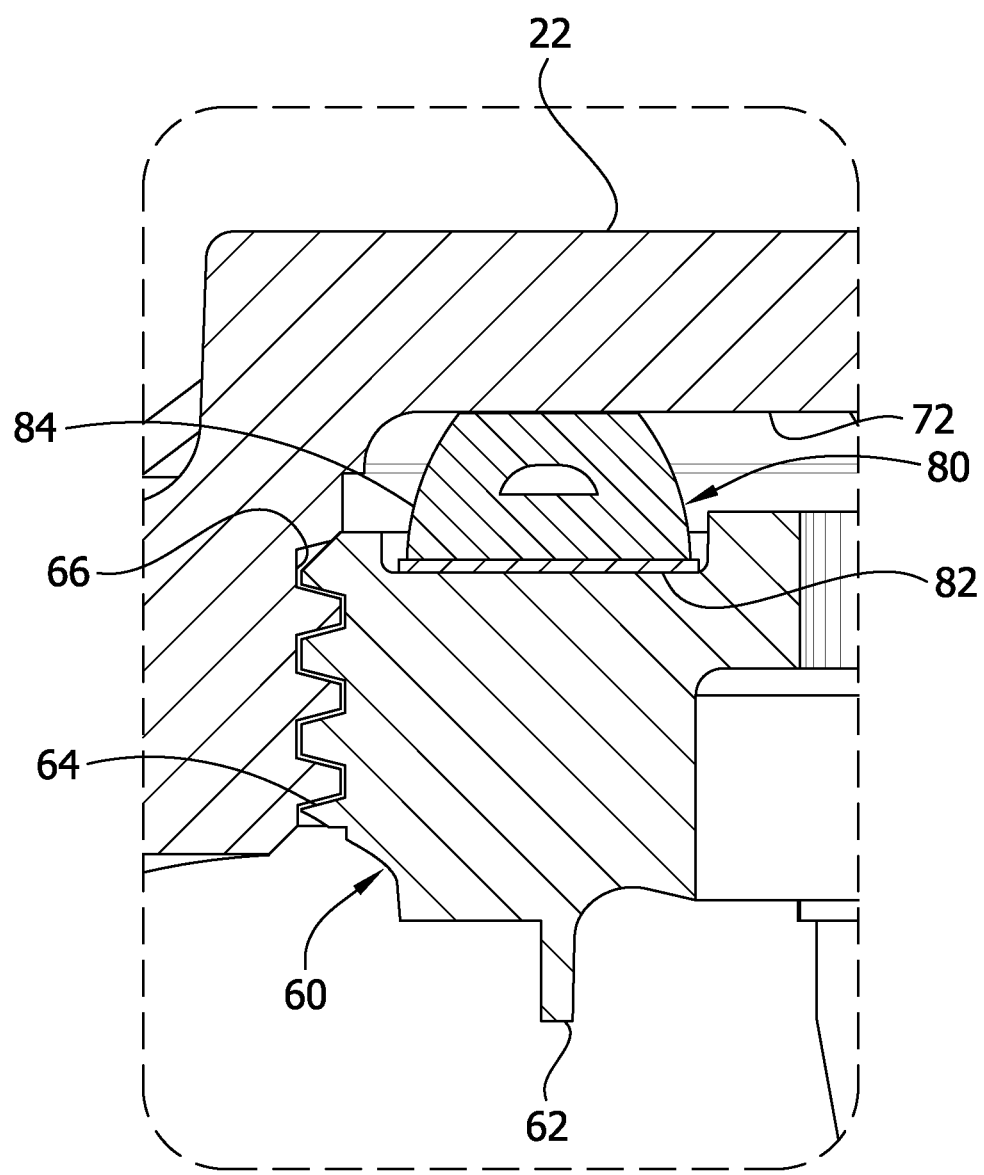
FIG. 5 is a detail of the adjusting ring positioned in the clutch cover having the adjusting ring repositioned.

As the adjustment mechanism turns the adjusting ring 60 relative to the cover 22 and the adjusting ring moves actually relative to the cover, the smooth face 70 on the adjusting ring moves relative to the corresponding land 72 on the cover. Depending upon the direction the adjusting ring 60 turns, the face 70 and land 72 move closer together or farther apart. When moving closer together, the face 70 and land 72 compress the compressible ring 84 as shown in FIG. 5. When moving farther apart, the elastically compressible ring 84 expands to fill the increasing gap between the face 70 and land 72. Thus, the seal assembly 80 always fills the gap between the face 70 and land 72 so contamination cannot accumulate at the threaded interface between the adjusting ring 60 and cover 22. As will also be appreciated by those skilled in the art, forming the groove 68 in the adjusting ring 60 eliminates lugs protruding from the corresponding surface of conventional adjusting rings. Eliminating these lugs eliminates structure where contamination formerly accumulated on conventional adjusting rings.

Figure 6:
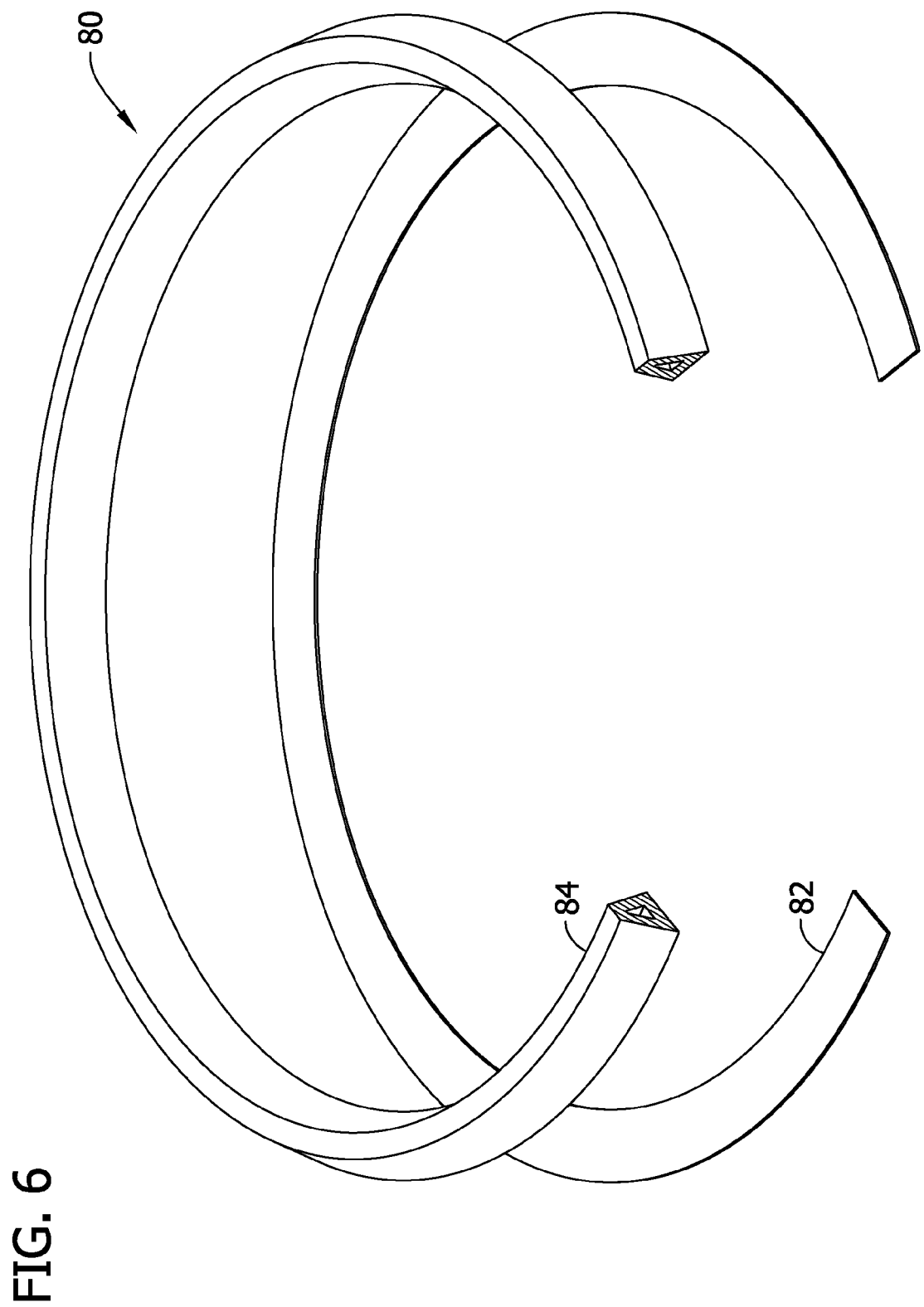
FIG. 6 is a fragmentary separated perspective of the seal.
Corresponding reference characters indicate corresponding parts throughout the drawings.

Assembly is the same as conventional assemblies but adding the seal assembly 80. The current assembly procedure includes threading the adjusting ring 60 into the clutch cover 22. The new procedure includes preassembling a seal assembly 80 as shown in FIG. 6 by bonding a compressible ring 84 to an annular plate 82 using an adhesive having a suitable temperature capability. Although other adhesives may be used without departing from the scope of the present invention, in one embodiment the adhesive is Loctite Product 5605 very fast curing, high strength, two component, neutral cure silicone made by Henkel Loctite Corp. of Rocky Hill, Conn. The preassembled seal assembly 80 is positioned in the groove 68 of the adjusting ring 60 so the ring 82 faces the smooth face 70 of the groove. Once the seal assembly 80 is in position, the adjusting ring 60 with the preassembled seal is threaded into the clutch cover 22. It is envisioned that the seal assembly 80 may be temporarily held in the groove of the adjusting ring 60 with a suitable grease or bees wax before the ring is inverted so the ring can be threading in the clutch cover 22. Initially, the compressible ring 84 foam is compressed such as shown in FIG. 5. As the clutch wears and the adjusting ring 60 moves away from the cover 22, the compressible ring 84 expands toward its original, uncompressed state, filling the gap between the adjusting ring and cover and preventing particles from passing into the result cavity adjacent the threads 64, 66.

As previously discussed, contamination tends to migrate under centrifugal loading toward inwardly facing surfaces and away from outwardly facing surfaces. Accordingly, contamination does not tend to build up on the outwardly facing threads 64 of the adjusting ring 60. As illustrated in FIG. 2, the inwardly facing threads of the cover 22 are exposed between the adjusting ring 60 and cover, but are shielded by the adjusting ring 60 on the portion nearer the flywheel F. The seal assembly 80 prevents contamination from reaching the exposed inward facing threads 66 of the cover 22, thereby preventing contamination of the threaded interface between the adjusting ring 60 and the cover. As contamination does not accumulate, the threaded interface is less likely to seize due to contamination. Accordingly, the clutch assembly 20 is less likely to have shortened service intervals or a shortened life due to contamination build up when the seal assembly 80 is in position. As will be appreciated by those skilled in the art, the seal assembly 80 may be inserted in the clutch assembly 20 during its initial build or the clutch assembly 20 may be retrofitted with a seal assembly to improve the clutch durability.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A clutch assembly, comprising:
   a cover adapted for connecting to a driving member extending along a central axis and having a threaded inwardly facing surface;
   an adjusting ring having a threaded outwardly facing surface threadably received in the inwardly facing surface of the cover for selective rotation with respect to the cover about the central axis to change a relative axial position of the adjusting ring relative to the cover;
   a pressure plate coaxially mounted on the cover for axial movement relative to the cover;
   a friction disc adapted for connection to a driven member coaxially mounted on the cover adjacent the pressure plate;

a lever reacting against the adjusting ring to move the pressure plate into and out of engagement with the friction disc; and an elastically compressible seal assembly centered on the central axis and extending between an axially facing surface of the cover and an axially facing surface of the adjusting ring opposing said axially facing surface of the cover to prevent contamination from passing the seal assembly and accumulating on the threaded inwardly facing surface of the cover.

2. The clutch assembly as set forth in claim 1, wherein the elastically compressible seal assembly comprises:

an annular ring; and an elastically compressible ring bonded to the annular ring, said compressible ring being sized and shaped for simultaneously contacting the cover and the adjusting ring when the adjusting ring is mounted on the cover to bridge the opposing axially facing surfaces of the cover and the adjusting ring.

3. The clutch assembly as set forth in claim 2, wherein said adjusting ring has a groove facing the cover; and the annular ring of the seal assembly is sized and shaped for receipt in the groove of the adjusting ring to center the seal assembly on the central axis.

4. The clutch as set forth in claim 2, wherein said compressible ring has a triangular cross section.

5. The clutch as set forth in claim 2, wherein said compressible ring has a first coefficient of friction on the cover and the annular ring has a second coefficient of friction on the adjusting ring that is less than said first coefficient of friction.

6. The clutch as set forth in claim 1, wherein said compressible ring comprises closed cell foam.

7. The clutch as set forth in claim 1, wherein said compressible ring is hollow.

8. A method of assembling a clutch assembly, comprising:

positioning a seal assembly on an axially facing surface of an adjusting ring;

threading the adjusting ring having the seal assembly in a cover so that the seal assembly simultaneously contacts an axially facing surface of the cover and the axially facing surface of the adjusting ring; and assembling a pressure plate and a friction disc on the cover having the adjusting ring and seal assembly.

9. The method as set forth in claim 8, wherein said seal assembly is positioned in a groove in the adjusting ring.

10. The method as set forth in claim 8, wherein said seal assembly is made by attaching a compressible ring to an annular ring.

11. A clutch assembly, comprising:

a cover adapted for connecting to a driving member extending along a central axis;

an adjusting ring threadably mounted on the cover for selective rotation with respect to the cover about the central axis to change a relative axial position of the adjusting ring relative to the cover, said adjusting ring including a groove facing the cover; and a seal assembly including an annular ring sized and shaped for receipt in the groove of the adjusting ring to center the seal assembly on central axis, and a elastically compressible ring attached to the annular ring, said compressible ring being sized and shaped to contact the cover when the adjusting ring is mounted on the cover to prevent contamination from passing the seal assembly and accumulating on inwardly facing threads of the cover.

12. The clutch as set forth in claim 11, wherein said seal assembly turns in the groove of the cover and remains circumferentially stationary relative to the cover when the adjusting ring turns in the inwardly facing threads of the cover.

13. The clutch as set forth in claim 12, wherein said compressible ring has a triangular cross section.

14. The clutch as set forth in claim 12, wherein said compressible ring generates a first friction force and the annular ring generates a second friction force that is less than said first friction force.

15. The clutch as set forth in claim 11, wherein said compressible ring comprises closed cell foam.

16. The clutch as set forth in claim 11, wherein said compressible ring is hollow.

* * * * *